United States Patent
Grommes

[11] 3,912,178
[45] Oct. 14, 1975

[54] CRUSHING ROLLER MILL
[75] Inventor: Helmut Grommes, Duisburg, Germany
[73] Assignee: The Babcock & Wilcox Company, New York, N.Y.
[22] Filed: Apr. 25, 1974
[21] Appl. No.: 464,274

[30] Foreign Application Priority Data
May 3, 1973 Germany............................ 2322182

[52] U.S. Cl. ................................................ 241/110
[51] Int. Cl.² ........................................ B02C 15/00
[58] Field of Search ........... 241/110, 111, 114, 117, 241/118, 120, 121, 122, 293, 294, 295; 29/129, 129.5; 301/9 AH, 9 DH; 295/15, 18, 45

[56] References Cited
UNITED STATES PATENTS
1,041,632  10/1912  Kelly........................................ 295/15
3,730,446  5/1973  Piepho................................... 241/110

Primary Examiner—Granville Y. Custer, Jr.
Attorney, Agent, or Firm—J. Maguire; E. A. Mosley; V. M. Fazzari

[57] ABSTRACT

A replaceable and reversible hard surface wearing ring for a pulverizer roller, where the ring is locked in position on the hub of the roller by a shoulder on one side of the hub and a bolted retaining ring on the opposite side of the hub. Insertable blocks engaging both the hub and the wearing ring lock the assembly against relative rotation during operation.

3 Claims, 3 Drawing Figures

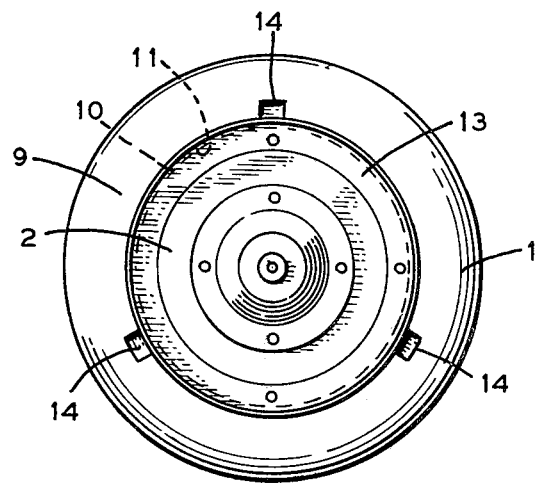

CRUSHING ROLLER MILL

The invention pertains to a crushing roller for a pulverizing or crushing mill, said roller having a reversible and a replacable annular cambered hard shell ring with a U-shaped symmetrical cross section profile. The flanks of the hard shell ring are inserted stress-free over cylindrical seating surfaces of a hub and are secured therebetween a shoulder on the hub and a retaining ring attached to the hub. Such an arrangement secures the hard shell ring so as to prevent its rotation on the hub.

The hard shell ring is a wear part of the mill. In the mill, the crushing pressure from the roller axis and from the hub is transferred to the hard shell ring which is rolling on a ring-shaped grinding race of a rotating bowl. After about one half of the hard shell thickness of the ring is worn out, the declining output of the mill can be restored by reversing the hard shell ring. This will also extend the running time of the hard shell rings.

Such crushing roller is already known for example as shown in U.S. Pat. No. 3,730,446. To secure the hard shell ring against rotation on the hub a protruding rib is usually provided on the U-shaped cross section profile that extends radially toward the center and engages into a slit on the hub. In order to be able to insert the hard shell ring on the hub, the slit must extend for the entire length of the hub up to face of the shoulder, whereby the cylindrical seat on the hub is interrupted.

The extended rib protrudes into the bore and impedes the machining of the cylindrical surfaces at both flanks of the hard shell ring. Such machining rechucking on the lathe. The cylindrical seating surface of the hub is exposed to form and dimension changes through the slit. Such changes can cause a premature loss of the hub.

It is also known, to secure exchangeable hard shell rings against axial movements and against rotation on the hub, where seating surfaces have no slits and the hard shell ring has no projecting rib. However, hard shell rings so secured cannot be reversed on the hub.

The objectives of this invention are, to improve the seating conditions of the hard shell ring on the cylindrical seating surfaces of the hub, and to provide a crushing roller, as described above with a reversible hard shell ring inserted stress-free on the hub of the roller.

According to this invention the objective to secure the hard shell ring against rotation on the hub is solved by providing recesses on both faces of its flanks. The recesses are distributed along the circumference and are radially open towards the center of the hub Block-like protrusions that extend radially from the hub engage the recesses in a stress-free manner.

The protrusions on the hub secure the hard shell ring against rotation through interlocking with the recesses on one face of the hard shell ring. After reversing the hard shell ring the same protrusions on the hub similarly interlock with the recesses in the other face. Such an arrangement achieves the elimination of the slot which interrupts the cylindrical seating surface. As such, both borings of the hard shell's flanks can now be machined without rechucking on the lathe, thus resulting in more accurate alignment. This way, the seating conditions of the hard shell ring on the hub are improved due to the accurate alignment of both borings and due to the longer lasting dimensional accuracy of the full cylindrical seating surface on the hub.

The recesses are produced in a simple way during the casting of the hard shell ring and need not be machined. The protrusions can be made from blocks of rectangular prismatic shapes and can be inserted into grooves in the hub and secured with bolts. During the reversal or exchange of the hard shell ring the blocks can also be exchanged if necessary.

The advantages achieved through the invention consist mainly in that through the accurate alignment of the borings in the hard shell ring it is much easier to slide the ring on the hub during reversal or exchange and that through longer lasting dimensional accuracy of the cylindrical seating surface of the hub a premature loss of the hub can be prevented.

An example of the application of the invention is depicted on the drawing and is further explained in the following:

FIG. 3 is a view of the roller taken along line 3—3 of FIG. 1 so as to show in detail the way in which the retaining ring cooperates with the hub and flank to provide a restraint of lateral movement of the hard ring shell.

Figure 1:
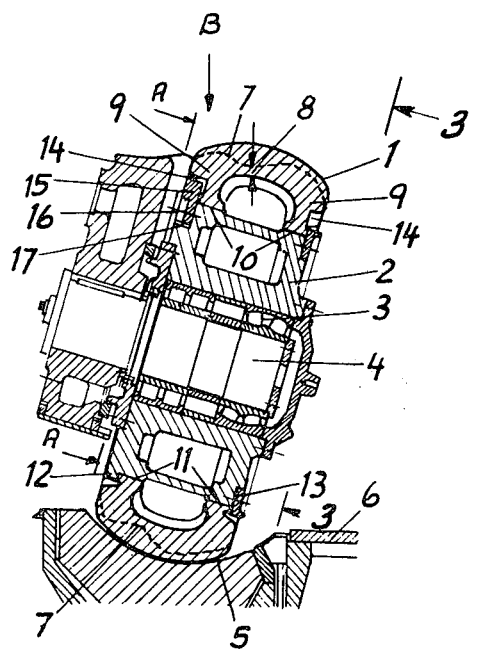
FIG. 1 shows an axial section of a crushing roller along line I—I of FIG. 2.
Figure 2:
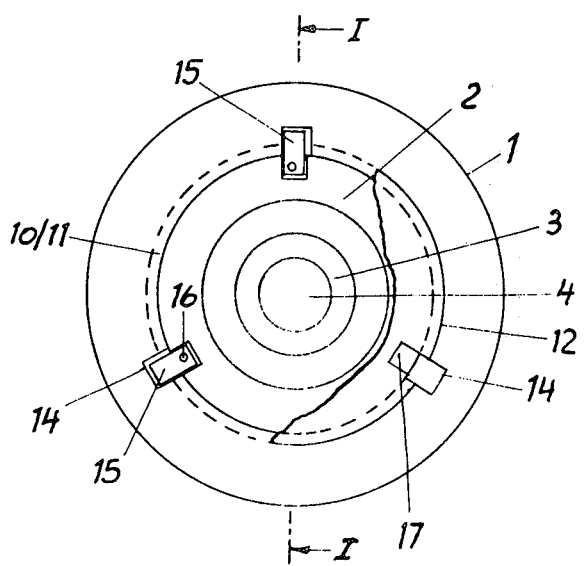
FIG. 2 shows a view in direction of arrow A in FIG. 1.

The crushing roller consists of a hard shell ring 1 and a hub 2. The hub can rotate on the axis 4 on roller bearings 3. While the axis 4 is stationary the hard shell ring 1 of the crushing roll rolls on a ring shaped grinding race 5 of a horizontal grinding bowl 6. The bowl 6 is turned by a vertical shaft (not shown) which is driven by a motor. Three or more identical crushing rollers (not shown) roll on the grinding bowl. The grinding pressure is transferred in the direction of the arrow B through the axis 4, the roller bearing 3, the hub 2 and the hard shell ring 1 to the grinding race 5 where the material to be ground is rolled over and crushed. During the crushing action the hard shell is being worn about as indicated by the dash line 7. When the hard shell ring has about half of its thickness 8 worn out, it is reversed in order to restore the grinding output of the mill and to better utilize the wear material of the hard shell ring.

In order to be able to reverse the hard shell ring 1, it must have a symmetrical cross-sectional profile of a U-shape. The flanks 9 of the cross-sectional profile have borings 10 which are accurately aligned and are of the same diameter. The hub 2 has cylindrical seating surfaces 11 on which the borings 10 of the hard shell ring are fitted without stress. The borings 10 must be accurately seated on the bearing surface 11 so that the bearing surface 11 of the hub is not destroyed during the transfer of the crushing pressure while the mill is in operation. The stress-free seating permits an easy exchange and reversal of the hard shell ring 1. However satisfactory safeguards against axial movement and against rotation on the hub 2 are required.

To secure against axial movements, the hub 2 is provided on one face with a rim 12 and on the other face with an attached safety ring 13. The flanks 9 of the hard shell ring are held securely between the hub rim 12 and the retaining ring 13.

To secure against rotation of the hard shell ring 1 on the hub 2, the hard shell ring is provided, according to the invention, with three recesses 14 on each of the two faces of the flanks 9, said recesses being radial and open towards the center, into which, in one face, block-like protrusions 15 engage so that they (the blocks) radially surpass the hub rim 12.

The protrusions 15 consist of blocks, in the form of rectangular prisms, which are inserted play-free into grooves 17 which are provided on one face of the hub. The prisms are secured there with bolts 16. The heads of the bolts 16 are hidden within sunken holes in the blocks.

The recesses 14 are produced during the casting of the hard shell ring 1 and are higher than the protrusions 15 so that the protrusions 15 engage into the recesses 14 in a stress-free manner. The engagement always bears on one side, that side in the direction of rotation and in that way play-free locking against rotation of the hard shell ring relative to the hub can be secured.

To reverse the hard shell ring, the crushing roller is swung out of the mill in a known way and the safety ring 13 is removed from the hub 2. Then, the hard shell ring is pulled off the cylindrical seating surface 10, is reversed and put on again so that now the protrusions 15 on the hub engage, the same way, in the recesses 14 of the other face of the hard shell ring. After bolting on the retaining rings 13 and after reswinging of the crushing roll into the mill, the reversing of the hard shell ring is completed and the grinding output of the mill is restored again.

The accurate alignment of the borings 10 which is achieved during the machining and the continuity of the cylindrical seating surface 11, together insure a tight but stress-free bearing through which the seating conditions of 10/11 are improved.

The embodiments of the invention in which an exclusive property or privilege is claimed are defined as follows:

1. A crushing roll for a mill comprising: a reversible hard shell annular ring with camber, flanks and a U-shaped symmetrical cross section profile wherein the hard shell ring is provided on both faces of the flanks in a mirror image fashion with equal recesses arranged radially and open towards the center, a hub the outer bearing surface of which seats the annular ring, a hub rim extending radially slightly beyond the hub's outer bearing surface, a retaining ring contacting the flanks of the annular ring and the hub so as to co-act with the hub rim to restrain lateral movement, protrusions extending radially outward from the hub so as to surpass the hub rim and engage the recesses in a stress-free manner.

2. A crushing roll according to claim 1 wherein the protrusions are made of blocks in the form of rectangular prisms which are inserted into slots provided in the hub and are secured with bolts.

3. A crushing roll according to claim 2 wherein the heads of the bolts are sunken in the prismatic blocks.

* * * * *